Jan. 26, 1960 R. J. MOERKES 2,922,409
METHOD AND APPARATUS FOR COOLING GAS ENGINES
WHEN NOT IN OPERATION BUT STILL HOT
Filed Aug. 26, 1958 2 Sheets-Sheet 1

Rudolph J. Moerkes
Inventor
Emmet L. Stack
Atty

Jan. 26, 1960     R. J. MOERKES     2,922,409
METHOD AND APPARATUS FOR COOLING GAS ENGINES
WHEN NOT IN OPERATION BUT STILL HOT
Filed Aug. 26, 1958     2 Sheets-Sheet 2
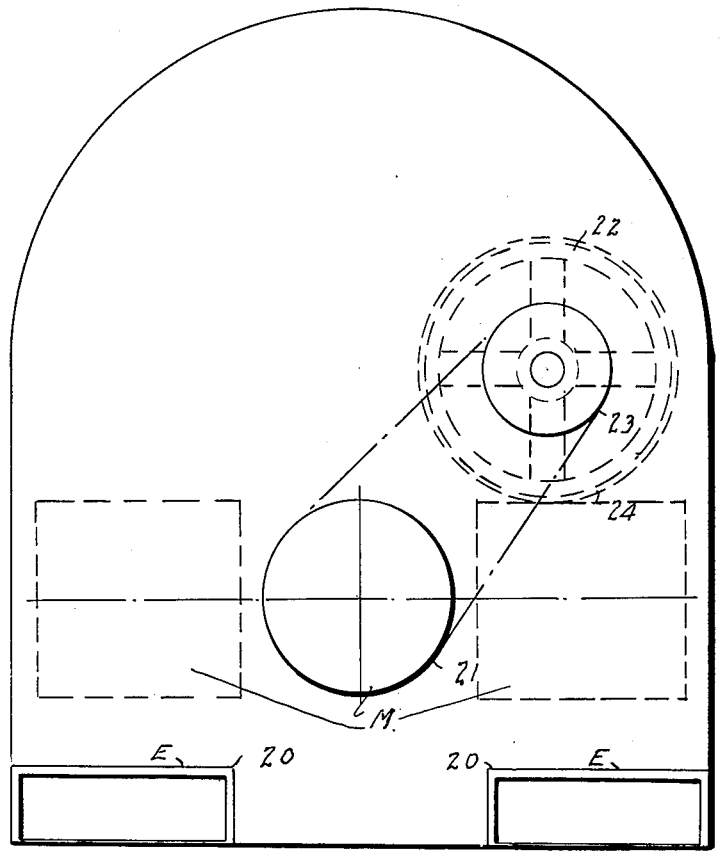
Fig. 7.
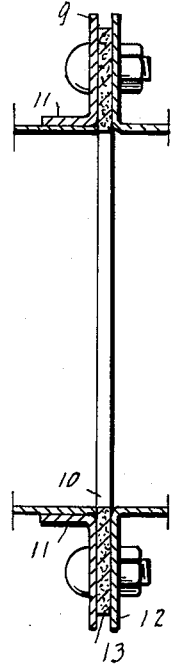
Fig. 6.
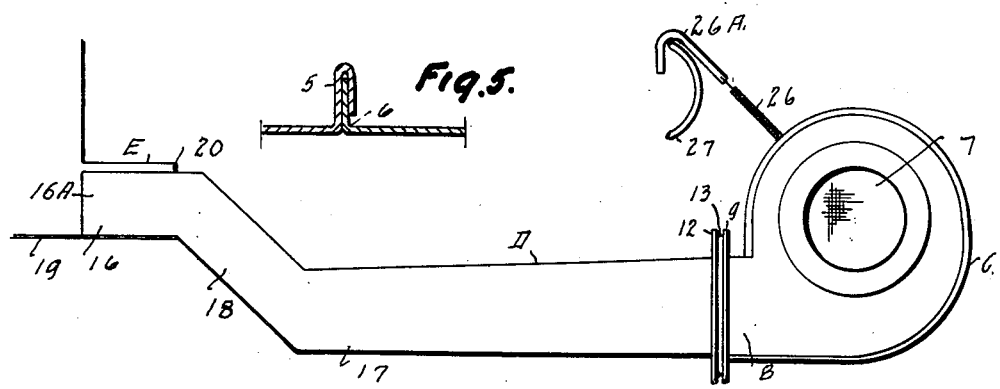
Rudolph J Moerkes
Inventor

2,922,409
METHOD AND APPARATUS FOR COOLING GAS ENGINES WHEN NOT IN OPERATION BUT STILL HOT

Rudolph J. Moerkes, Beaverton, Oreg.

Application August 26, 1958, Serial No. 757,304

5 Claims. (Cl. 123—41.01)

My invention relates to means for cooling hot air-cooled gas engines.

The objective of the invention is to speed up the cooling of these engines when they come into the shop for repairs or adjustment.

Some foreign cars, such as the "Volkswagen," are equipped with air-cooled engines and are designed to operate at very high temperatures. When they come into the shop they are so hot that it normally takes about three hours to cool them off so that they can be worked upon. It is a characteristic of the "Volkswagen" engine that while it operates at a very high temperature it must be cold when its valves are adjusted.

As a consequence of the cooling-off requirement the customer is delayed, the shop is delayed, and much valuable space is occupied by cars whose engines are cooling down.

My principal objective, therefore, is to provide means whereby this cooling off of the engine may be greatly speeded up. Because of the means and method which I use the usual three hour cooling off period is cut down to approximately thirty minutes.

The means and method which I employ are shown and described in this specification and accompanying drawings.

Figure 1:
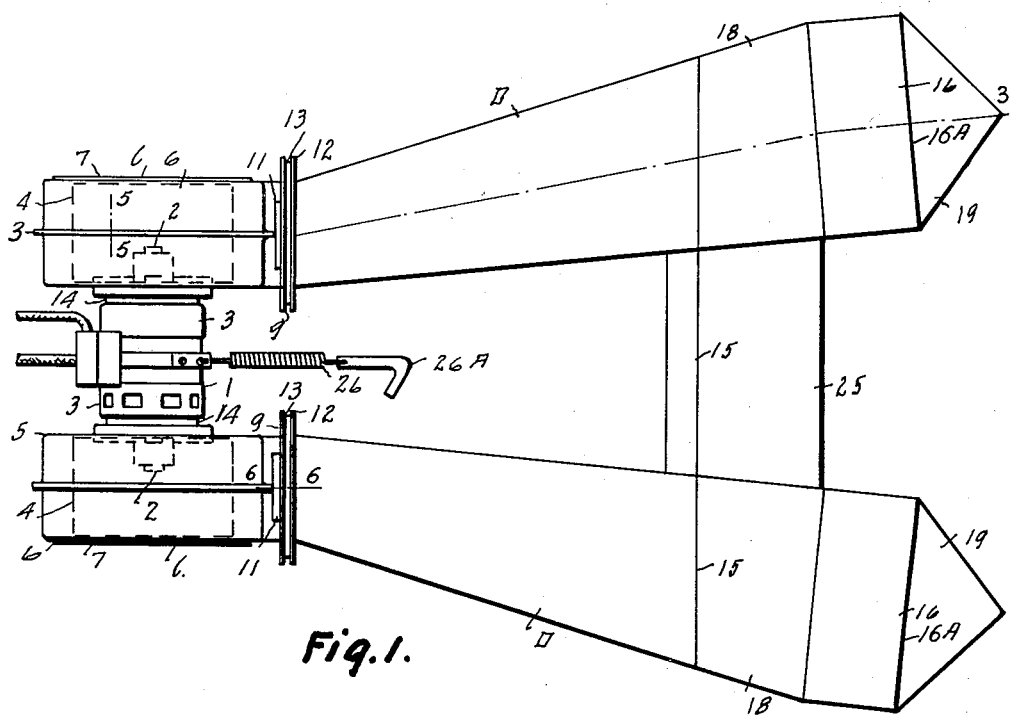
Figure 2:
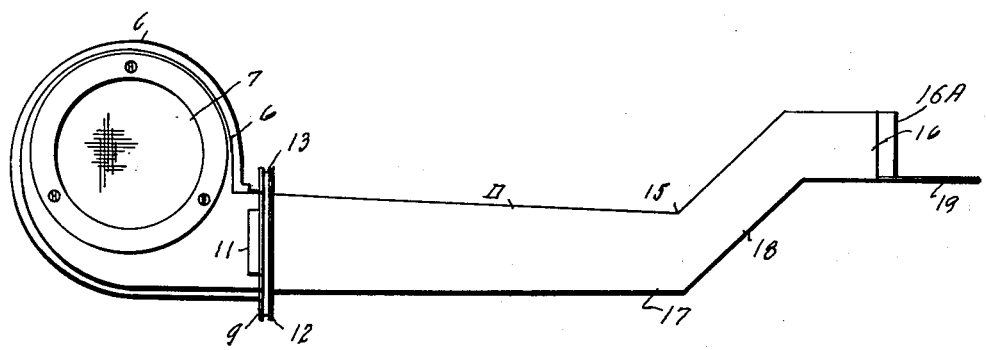
Figure 3:
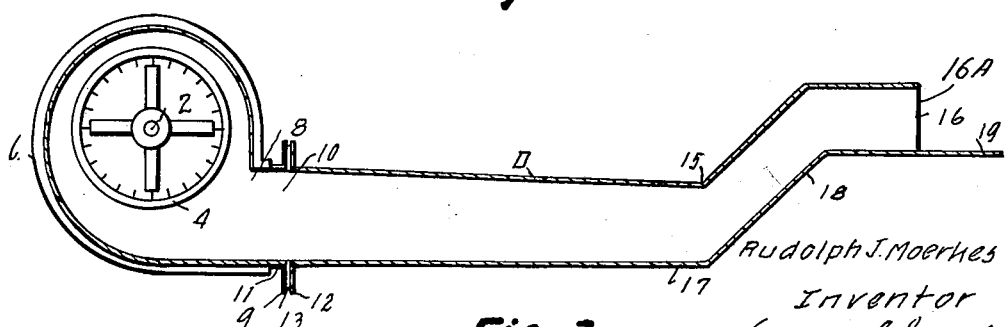

Fig. 1 of the drawings is a plan view of the entire assembly of my device; Fig. 2 is a side elevation of said entire assembly; Fig. 3 is a vertical section on the line 3—3 of Fig. 1; Fig. 4 is a diagrammatic elevation showing the cooling device attached to the auto during the cooling of the engine; Fig. 5 is a full size section on the line 5—5 of Fig. 1; Fig. 6 is a full size section on the line 6—6 of Fig. 1; Fig. 7 is a diagrammatic front elevation of the "Volkswagen" cooling system.

Throughout the drawings and the specification similar numerals refer to similar parts.

I find a 1/8 H.P. 1400 r.p.m. single phase electric motor adequate to drive a pair of 5" fans which I use to move approximately 320 cubic feet of free air per minute through my gas engine cooling means.

This motor 1 has a rotor shaft 2 which extends beyond the motor casing end bells 3 which carry the bearings (not shown) in which are journalled said rotor shaft 2. A fan 4 is mounted on each end of said rotor shaft 2 as shown in Fig. 1. Each end bell 3 is bolted to the portion 5 of the fan casing C formed in two parts, as 5 and 6, which are joined together in the manner shown in Fig. 5. The outer or end face of the portion 6 of the fan casing C has a circular opening 7 formed therein concentric with the fan 4 and of a slightly greater diameter than the fan 4 so that said fan 4 may be removed as a unit from the casing C. Air is drawn through this opening 7 in the fan casing C by the fan 4 and eventually directed around the car gas engine M to be cooled.

Each portion 5 and 6 of the fan casing C is formed with a spiral or scroll-like conformation, as shown in Figs. 2 and 3, and terminates in a throat 8 of square cross section. A square flange 9 of greater area than the casing throat 8 has an opening 10 therein for the reception of the throat portion 8 which is made to fit snugly in said opening 10. The flange 9 has outstanding collar portions 11 formed integral therewith and adapted to fit snugly over the casing throat portion 8 to which the collar portions 11 are welded. See Fig. 6.

A flange 12 similar to the flange 9 is formed on the air duct D and is bolted to said flange 9 with a piece of insulating material 13 therebetween. Insulating material as the rubber ring 14 is placed between the end bells 3 and the casing portions 5.

The air duct D changes in form from a square cross section at the flange 12 to an oblong cross section at the line 15 which is approximately 13" from and parallel to the flange 12. The terminal portion 16 of the duct D is oblong in cross section and about 3" in length and lies in a plane above the duct portion 17 at the line 15. The duct portions 16 and 17 are connected by a portion 18 which extends upwardly at about a 45 degree angle from the duct portion 17. The bottom of the duct portion 16 extends beyond the end 16A of said terminal portion 16 as a triangular shaped tongue 19 for the purpose of guiding the terminal duct portion 16 into the terminal ends 20 of the exhaust port E of the engine shroud S of the air cooling system of the "Volkswagen" car. Fig. 7 shows the general relation of the fan drive pulley 21, the fan 22, the fan pulley 23, the air inlet opening 24, and the terminal ends 20 of the air exhaust ports E of said engine shroud S of the "Volkswagen" car. These air exhaust ports E are slightly larger than the terminal duct portions 16 of my cooling means which are adapted to be received in said exhaust ports E. The shroud S is formed to direct air entering the inlet 24 over the engine and out through the exhaust ports E, when said engine is in operation. However, when the engine is inoperative but hot it is cooled down by inserting the ducts D of my cooling means in the exhaust ports E of the shroud S and forcing cool air over the hot engine and out thru the inlet opening 24.

The fan casing C and the air ducts D of my cooling means together with the spacing strut 25, which ties the twin ducts D of my cooling means together, are formed of sheet metal.

I am aware of a device which employs the gas engine fan to cool said engine when idle but hot. It takes fifteen minutes just to install this device. In the time it takes to install and remove this device I can have the engine cooled for it is but a matter of 10 seconds to install and remove my 15# cooling device whose duct ends merely slip into the air exhaust ports of the gas engine to be cooled. The opposite or fan end of the device is supported by the strap 26 whose end 26A is hooked over the car bumper 27 as shown in Fig. 1.

I find that the cooling-down period is much less with my device wherein air is moved in reverse to the flow caused by the engine fan.

Since time is of the essence to both the car owner and the shop my gas engine air-cooling device has made a considerable contribution toward saving time and space in the shop.

While I have described the application of my cooling means to the "Volkswagen" double air exhaust port engine my cooling device may be modified to fit other air-cooled cars without departing from the scope of the appended claims.

I claim:

1. In combination, a shroud having a cooling-air inlet and a cooling-air exhaust port and enclosing an air-cooled gas engine, and means for cooling said engine when not in operation but still hot which includes an air-moving means and an air duct to convey air from said air-moving means into the engine shroud through said cooling-air exhaust port.

2. In combination with an air-cooled engine shroud provided with a cool air inlet and a hot air outlet means to cool the engine when not in operation but still hot which includes an air-moving means having portions engageable with the hot air outlet and adapted to convey air from said air-moving means into the hot air outlet from which it flows over the engine and out through the normally cool air inlet of the shroud.

3. In combination with an air-cooled engine shroud provided with a cool air inlet and a hot air outlet means to cool the engine when not in operation but still hot which includes an air-moving means having portions telescopically engageable with the hot air outlet and adapted to convey air from said air-moving means into the hot air outlet from which it flows over the engine and out through the normally cool air inlet of the shroud.

4. In combination with an air-cooled engine shroud provided with a cool air inlet and spaced apart hot air outlets means to cool the engine when not in operation but still hot which includes an air-moving means having portions telescopically engageable with the hot air outlets and supported thereby and adapted to convey air from said air-moving means into the hot air outlets from which it flows over the engine and out through the normally cool air inlet of the shroud and a suspension means attached to the air-moving means rearwardly of its afore mentioned supported portions.

5. The method of cooling an air-cooled gas engine of the shrouded type not in operation but still hot which includes introducing and forcing cooling air through the normal hot air outlet of the shroud over the engine and out through the normal cool air inlet of said shroud.

References Cited in the file of this patent

UNITED STATES PATENTS

| | | |
|---|---|---|
| 1,491,589 | Dzus | Apr. 22, 1924 |
| 2,573,544 | Colby | Oct. 30, 1951 |
| 2,656,826 | Galuska | Oct. 27, 1953 |
| 2,853,061 | Elsbett | Sept. 23, 1958 |